May 7, 1935.  J. W. WHITE  2,000,155
APPARATUS FOR FORMING BRAKE DRUMS
Filed July 30, 1932  3 Sheets-Sheet 1

INVENTOR
John William White
BY
ATTORNEYS

May 7, 1935. J. W. WHITE 2,000,155
APPARATUS FOR FORMING BRAKE DRUMS
Filed July 30, 1932 3 Sheets-Sheet 2

INVENTOR
John William White
BY
ATTORNEYS

May 7, 1935.  J. W. WHITE  2,000,155
APPARATUS FOR FORMING BRAKE DRUMS
Filed July 30, 1932  3 Sheets-Sheet 3

INVENTOR
John William White
BY
ATTORNEYS

Patented May 7, 1935

2,000,155

UNITED STATES PATENT OFFICE 2,000,155

APPARATUS FOR FORMING BRAKE DRUMS

John William White, Detroit, Mich., assignor, by mesne assignments, to Kelsey-Hayes Wheel Company, Detroit, Mich., a corporation of Delaware Application July 30, 1932, Serial No. 626,266

5 Claims. (Cl. 22—65)

The invention relates to the manufacture of annular members and refers more particularly to an apparatus for and method of forming composite annular members and especially composite brake drums. One of the objects of the invention is to provide an improved apparatus for forming composite annular members and particularly brake drums whereby greater production with accuracy in the formation of the members, both from the metallurgical and mechanical view points, can be secured. Another object is to provide an improved apparatus for forming composite annular members and particularly brake drums so arranged that the cycle of operations may be automatically duplicated in the forming of successive members to secure like products having the same characteristics. A further object is to provide an improved method of forming composite annular members and especially brake drums whereby all the members made by this method are alike.

These and other objects of the invention will become apparent from the following description and claims, taken in connection with the accompanying drawings, in which Figure 1 is a side elevation, partly in section, of the casting unit of the apparatus;

Figures 2 and 3 are cross sections on the lines 2—2 and 3—3, respectively, of Figure 1;

Figure 1:
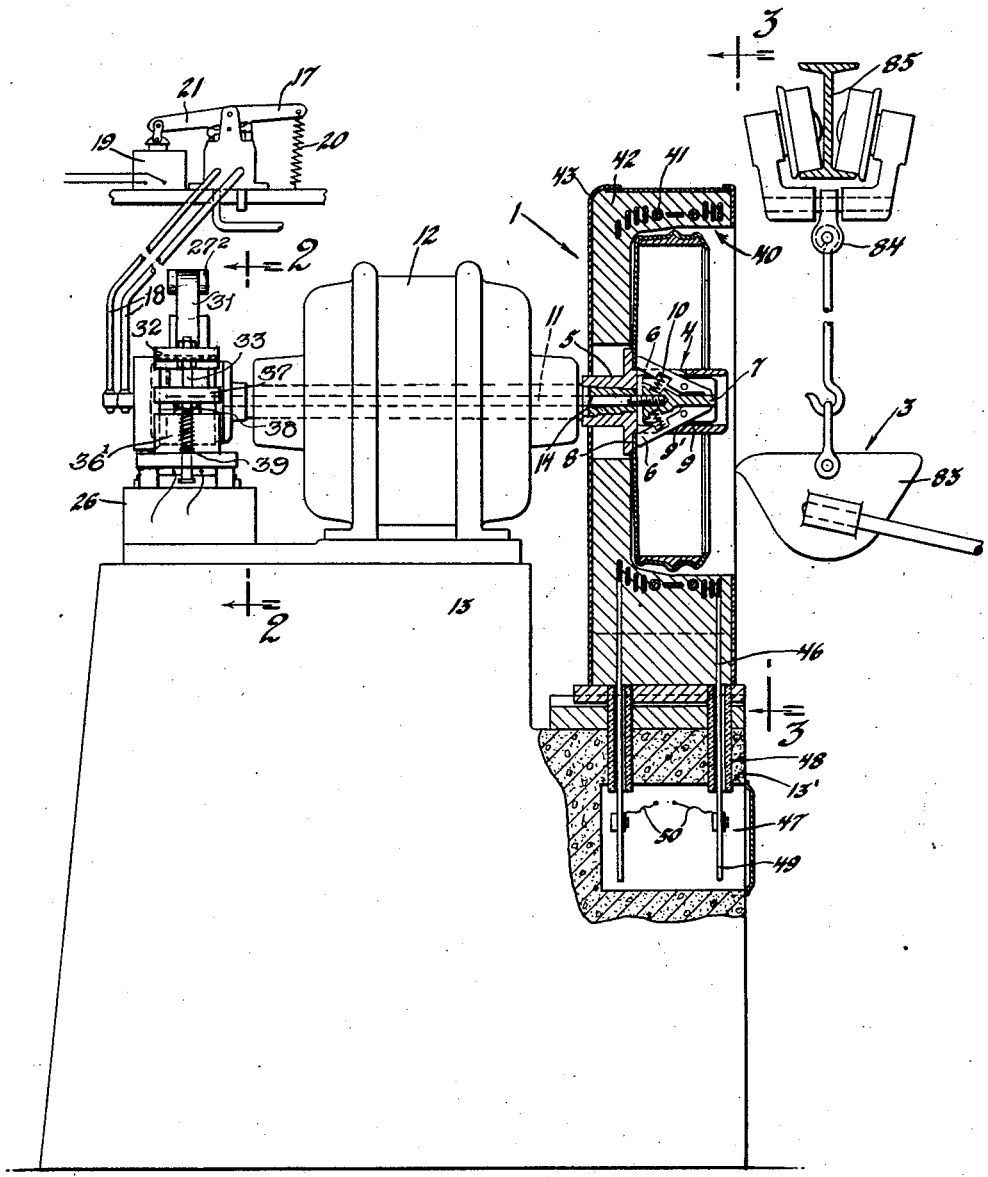
Figure 2:
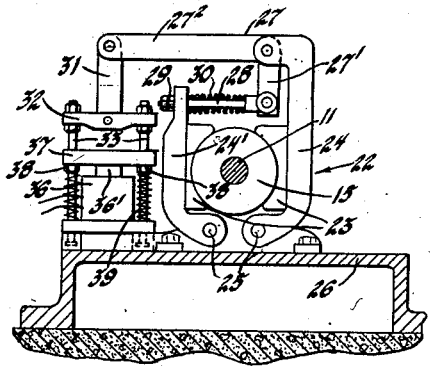
Figure 3:
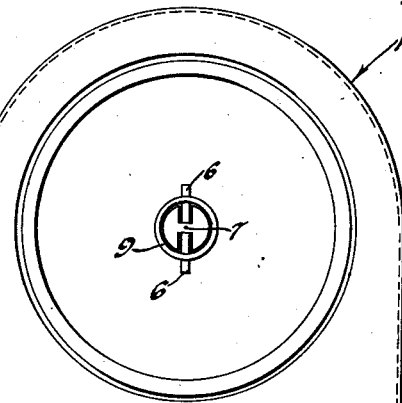

As shown in Figures 1, 2, 3 and 4, the apparatus, which is designed particularly to form a composite brake drum having a drawn or rolled sheet metal and preferably sheet steel body and a cast metal and preferably cast iron lining forming the brake engaging member, comprises the casting unit 1, the master control device 2 for the unit and the pouring device 3. The casting unit 1 comprises a chuck for the brake drum body, a heating device for the brake drum body when supported in the chuck, a motor for rotating the chuck, a braking device for the chuck and an operating device for the chuck. The master control device controls the operation of the heating device, the motor, the braking device and the operating device. The pouring device comprises a receptacle which is adapted to contain molten metal for forming the lining of the brake drum and the mechanism for carrying this receptacle between the furnace for the molten metal and the casting unit.

The casting unit 1 more specifically has the chuck 4 which comprises the support 5, the arms 6 and the actuating section 7. The support 5 has intermediate its ends the radially extending annular flange 8 which forms a shoulder for engaging the web of the brake drum body and the support also has extending forwardly from the annular flange the central tubular pilot 9 for guiding the web of the brake drum body to the annular flange. The actuating section 7 is located within this pilot and the arms 6 are pivotally connected at their inner ends to this actuating section and their free or outer ends are adapted to extend through the longitudinally extending slots 9' in the rear of the pilot 9. 10 are coil springs between the actuating section and the free or outer ends of the arms for normally forcing these ends outwardly through the slots to positions to engage the web of the brake drum body. The actuating section is secured to the rod 11 which forms part of the chuck operating device and extends axially and rearwardly through the support 5. This rod is movable axially or longitudinally to effect either the collapsing of the arms within the pilot or the expanding of the arms beyond the pilot and the engagement of the arms with the brake drum body to clamp the latter against the chuck support. The collapsing of the arms is caused in the present instance by the arms coming into contact with the front ends of the slots in the pilot, while the expanding of the arms is caused by the coil springs in engagement therewith.

The casting unit also has the electric motor 12 which is fixedly mounted upon the stationary base 13. The rotor shaft 14 at its front end has secured thereto the support 5 of the chuck, whereby the shaft will drive the support.

The casting unit also has the cylinder 15 which is secured to the rear end of the rotor shaft 14 to be driven thereby and within this cylinder there is the piston 16 which is secured to the rear end of the rod 11. This rod extends freely axially through the rotor shaft and the support 5. The cylinder 15 is provided with suitable ports at its opposite ends for the inlet and outlet of a medium under pressure, such as compressed air, and this cylinder, the piston 16 and the rod 11 constitute the device for operating the chuck to clamp the body of the brake drum to the chuck support or release the body, so that it may be removed and another inserted into place. 17 is the valve for controlling the inlet and outlet of the medium under pressure through the conduits 18, and 19 and 20 are respectively the solenoid and the coil spring for operating the valve through the arm 21.

The casting unit 1 also has the braking device 22 for the chuck and this device has the shoes 23 which are engageable with the periphery of the cylinder 15 and which are mounted upon the arms 24 and 24'. The lower ends of these arms are pivotally mounted at 25 upon the support 26 carried by the base 13. The upper end of the arm 24 is pivotally connected to the bell crank 27 at the junction of its arms. One of the arms 27' of this bell crank is shorter than the other arm 27² and extends vertically and is pivotally connected at its lower end to the rod 28, which latter extends through the upper end of the arm 24' and has threaded thereon the nut 29 for abutting this arm. There is also preferably the coil spring 30 encircling this rod and abutting the arm 24' opposite the nut 29. The outer end of the longer arm 27² which extends horizontally is pivotally connected to the upper end of the rod 31, which latter is pivotally mounted at its lower end on the cross head 32. This cross head is secured to the vertically extending rods 33 at opposite sides of the solenoid 36. 37 is a cross head upon the core 36' of the solenoid and sleeved upon the rods 33 and having its lower face engaging the nuts 38, which latter are threaded upon the rods 33. 39 are coil springs encircling the rods below the nuts and adapted to hold the rods and the cross heads in their uppermost positions to thereby hold the upper ends of the arms 24 and 24' away from each other and the shoes 23 out of contact with the cylinder 15. However, when the solenoid is energized it will apply the shoes to the cylinder through the intermediate parts.

The casting unit further has the electrical heating device 40 for the brake drum and more particularly for the annular flange and the adjacent part of the web of the brake drum body when held or supported in the chuck 4. This heating device comprises the high frequency coil element 41 which is preferably formed of a tubular wire to provide for the passage therethrough of a suitable cooling medium, such as water. The coils of this element are differentially spaced and, as shown, are greater in number or concentrated at the edges of the annular flange of the brake drum body, so that differential heating of the annular flange may be secured. The heating element is preferably imbedded in the lining 42 formed of suitable non-magnetic material, such as silica, and this lining is located within the housing or casing 43 which is also formed of a non-magnetic material and preferably of a non-magnetic alloy such as one having a nickel base. The lining and the housing or casing are provided with axial openings for receiving the support 5. The heating device, as above constructed, is a unitary structure and it is supported upon the base 13 at a lower elevation than the electric motor 12 and detachably secured thereto by suitable means, such as the bolts 44 and the nuts 45. The terminals 46 of the heating element 41 preferably pass downwardly through the lining 42 and the wall 13' of the base into the chamber 47 formed in the base, suitable insulator tubes 48 surrounding the portions of the terminals passing through the wall. The lower ends of these terminals are connected to and communicate with but are electrically insulated from the water pipes 49 within this chamber by means of rubber hose connections and the lower ends are also electrically connected to the high frequency wires 50 forming part of the heating circuit, these wires being ungrounded.

Figure 4:
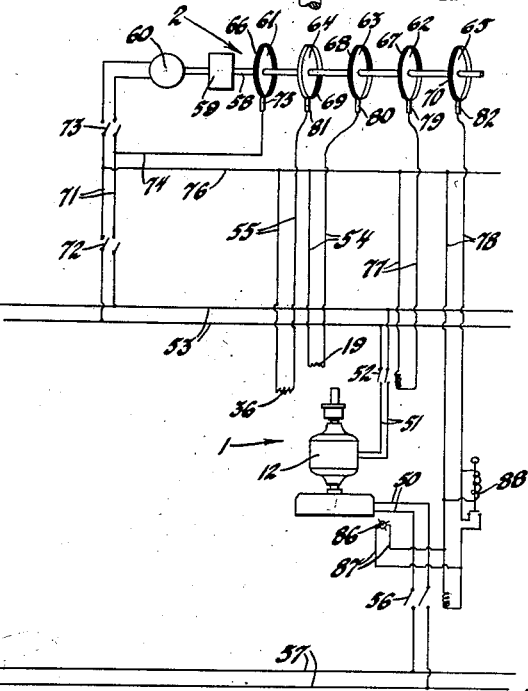
Figure 4 is a wiring diagram of the apparatus.

Referring more particularly to Figure 4, the motor circuit including the electric motor 12 has the wires 51 and the automatic switch 52, the wires being connected to the service wires 53. The chuck operating device circuit comprises the solenoid 19 and the wires 54 leading to the solenoid. The chuck braking device circuit comprises the solenoid 36 and the wires 55 leading to the solenoid. The heating circuit including the heating element 41 comprises the wires 50 and the automatic switch 56 with the wires connecting into the high frequency alternating current service wires 57.

The master control device 2 comprises the shaft 58 which is driven by a suitable speed reducer 59, which in turn is driven by the electric motor 60. Mounted upon and fixedly secured and preferably electrically connected to the shaft 58 are the rings 61, 62, 63, 64 and 65, the rings 62, 63, 64 and 65 controlling the making and breaking of the motor circuit, the chuck operating device circuit, the chuck braking device circuit, and the heating circuit, respectively. The ring 61 is provided with the continuous peripheral electrical conductor 66 and the rings 62, 63, 64 and 65 are provided with the arcuate peripheral electrical conductors 67, 68, 69 and 70, respectively, which are electrically connected to the electrical conductor 66 by suitable means, such as the shaft 58 and the rings. 71 are feed wires connected into the service wires 53 and controlled by the manually operable switch 72. These feed wires lead to the electric motor 60 and are preferably further controlled by the second manually operable switch 73. 74 is a wire leading from one of the feed wires 71 between the switches 72 and 73 to the contact 75, which engages the conductor 66 and 76 is a wire leading from the other of the feed wires 71 between the switches 72 and 73 and connected to one of the wires 54 and 55 and also to one of the wires 77 and 78 in which latter are located the solenoids of the automatic switches 52 and 56, respectively. 79, 80, 81 and 82 are contacts for respectively engaging the arcuate conductors 67, 68, 69 and 70 and these contacts are connected to the other of the wires 77, 54, 55 and 78, respectively.

The arrangement is such that upon closing the switches 72 and 73 and assuming the parts of the master control to be in the relative positions as diagrammatically shown in Figure 4 and the chuck 4 to be in collapsed position, the chuck operating device circuit is first broken through the arcuate conductor 68 so that the solenoid 19 becomes ineffective and the coil spring 20 functions to operate the valve 17, whereby the chuck is moved to extended or clamping position to firmly hold the body of the brake drum upon the support 5 of the chuck. Then the braking device circuit is broken through the arcuate conductor 69, so that the solenoid 36 becomes ineffective and the coil springs 39 function through the intermediate parts to disengage the brake shoes 23 from the cylinder 15. At the same time, the motor circuit is made through the arcuate conductor 67 and the automatic switch 52, whereby the motor 12 is started. Also at this time the heating circuit is made through the arcuate conductor 70 and the automatic switch 56, whereby high frequency alternating current flows through the heating element 41. The heating continues a predetermined length of time, as determined by the length of the arcuate conductor 70 and the R. P. M. of the shaft 58, the automatic switch 56 being opened and the heating circuit being broken when the arcuate conductor passes beyond the contact 82. Also, after a predetermined length of time the motor circuit is broken by the opening of the automatic switch 52, as determined by the length of the arcuate conductor 67 and the R. P. M. of the shaft 58. At the time of breaking the motor circuit, the braking device circuit is made through the arcuate conductor 69 and the brake shoes 23 are applied to the cylinder 15. Then the chuck operating device circuit is made through the arcuate conductor 68 and the chuck is released to permit removal of the brake drum and insertion of another, after which the above cycle may be again carried out.

While the annular flange and the adjacent part of the web of the brake drum body are heated and the brake drum body is being rotated at the proper predetermined R. P. M., which is usually between 800 and 1300, molten metal is poured from the ladle 83, which is carried by the trolley 84 running upon the track 85. The temperatures of the brake drum body and the molten metal at the time of pouring are such that effective fusing or molecular bonding takes place therebetween. Such temperatures vary, but in general that of the brake drum body generally may be between 1200 degrees F. and 1500 degrees F. and that of the molten metal generally may be between 2400 degrees F. and 3100 degrees F. The track preferably extends in front of and above the casting unit and terminates adjacent to a suitable furnace for heating and maintaining the molten metal at an approximate predetermined temperature.

For the purpose of indicating when the brake drum body and more particularly its annular flange and the adjacent portion of its web are at an approximate predetermined temperature, I have provided the light 86, which is located adjacent the heating device and preferably at one side thereof and which is in the light circuit having the wires 87. These wires are electrically connected in the present instance to the wires 78, which latter form part of the system for controlling the heating. With this arrangement, the light will glow only during the heating, so that the time of pouring is determined by the light ceasing to glow. The length of time during which the heating circuit is closed being predetermined to secure the approximate predetermined temperature, it will be seen that the light indicates the proper time for pouring.

For the purpose of varying the length of time that the heating circuit is closed independent of the ring 65, I have provided the time limit relay 88 in the wires 78 and so constructed that this relay may be set to open the circuit in which these wires are located and thereby open the heating circuit prior to the opening as controlled by the ring 65. The wires 87 of the light circuit are electrically connected to the wires 78 at points such that the relay also controls the light circuit.

Figure 5:
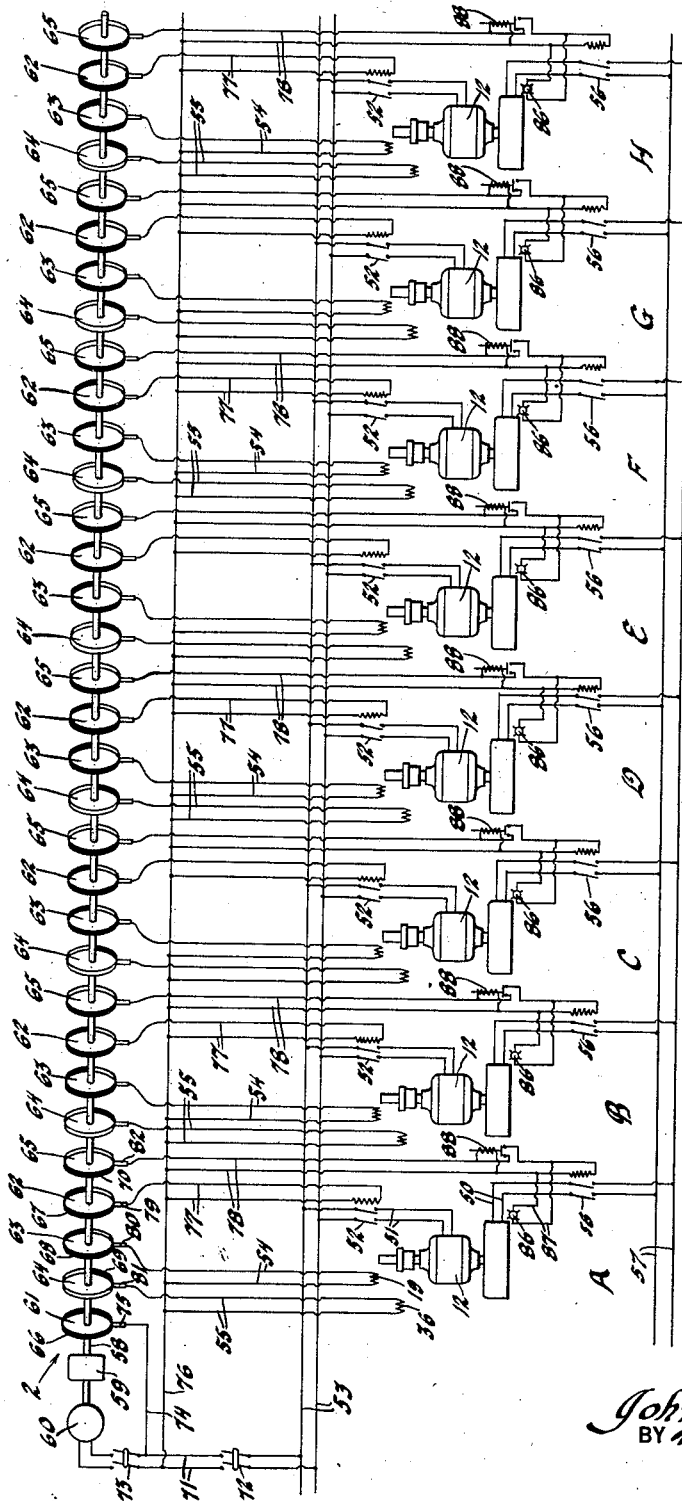
Figure 5 is a wiring diagram of a modified apparatus.

As shown in Figure 5, there are the casting units A, B, C, D, E, F, G and H which are preferably arranged in a row and in front of which the pouring ladle may pass. Preferably in this apparatus there are two pouring ladles and the furnace is located at one end of the row of casting units, the arrangement being such that while one pouring ladle is in use, the other is being filled. Each casting unit is made in the same manner as the casting unit 1 and the master electric control device is preferably made in the same manner as that previously described, although it and the control devices including the springs and solenoids in various circuits, such as the chuck operating device circuit and the braking device circuit, may be made so that the operation of these springs and solenoids may be reversed.

What I claim as my invention is:

1. In an apparatus for forming a lined annular member, the combination with a rotatable chuck for the annular member, means for rotating said chuck, means for braking said chuck and means for operating said chuck, of means for heating the annular member to a temperature to cause effective fusing thereof with the molten metal which forms the lining, common means controlling the operation of said rotating means, braking means, operating means, and heating means, and means for pouring molten metal into the annular member.

2. In an apparatus for forming a lined annular member, the combination with a rotatable chuck for the annular member and means for rotating said chuck, of means for heating the annular member while being held, a signal for indicating the heating of the annular member to an approximate predetermined temperature, means controlling the operation of said rotating means, heating means and signal, and means adapted to pour molten metal into the annular member.

3. In an apparatus for forming lined annular members, the combination with a plurality of units, each unit comprising a rotatable chuck for an annular member, means for rotating said chuck, means for heating the annular member while being held and a signal for indicating the heating of the annular member to an approximate predetermined temperature, of common means for controlling the operation of said rotating means, and heating means of all of said units, means controlled by the operation of one of said means of one of said units for controlling the operation of said signal for a different unit, and means adapted to pour molten metal selectively into the annular members.

4. In an apparatus for forming a lined annular member, the combination with a chuck for the annular member, of a motor circuit including a motor for driving said chuck, a heating circuit including an electrical heater for heating the annular member in said chuck to a temperature to cause effective fusing of said annular member with the molten metal which forms the lining, means for controlling the making and breaking of said circuits, and means adapted to apply molten lining material to the annular member.

5. In an apparatus for forming a lined annular member, the combination with a chuck for the annular member, of a motor circuit including a motor for driving said chuck, a heating circuit including an induction coil for heating the annular member in said chuck independently of said chuck, and a time limit relay for controlling the breaking of said heating circuit, a master controlling circuit for controlling the making and breaking of said motor and heating circuits, and means adapted to apply molten lining material to the annular member.

JOHN WILLIAM WHITE.